Nov. 4, 1941.  F. RIEBER  2,261,563
SYSTEM FOR MEASURING EARTH CONDUCTIVITY
Filed Feb. 18, 1939  3 Sheets-Sheet 2
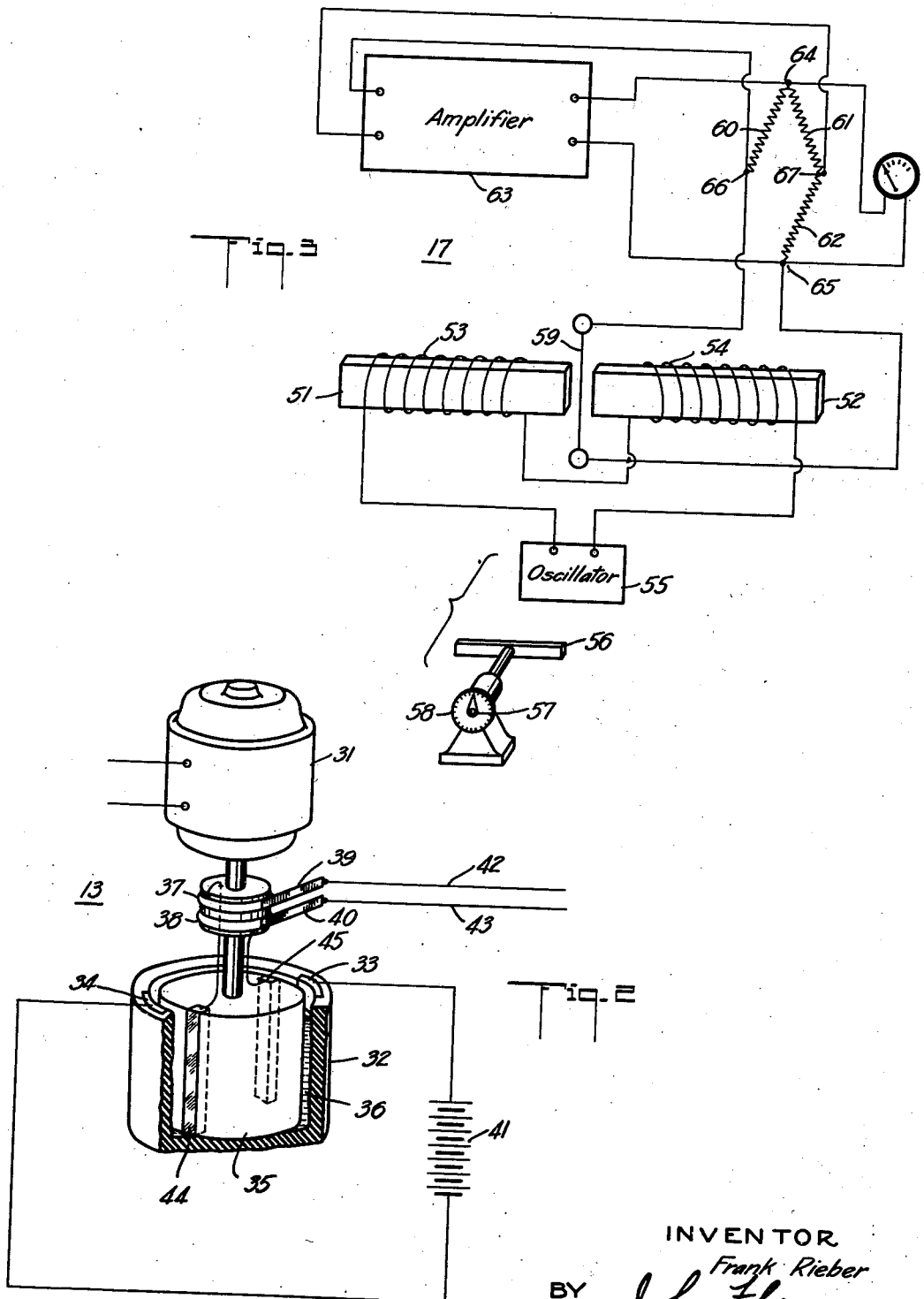

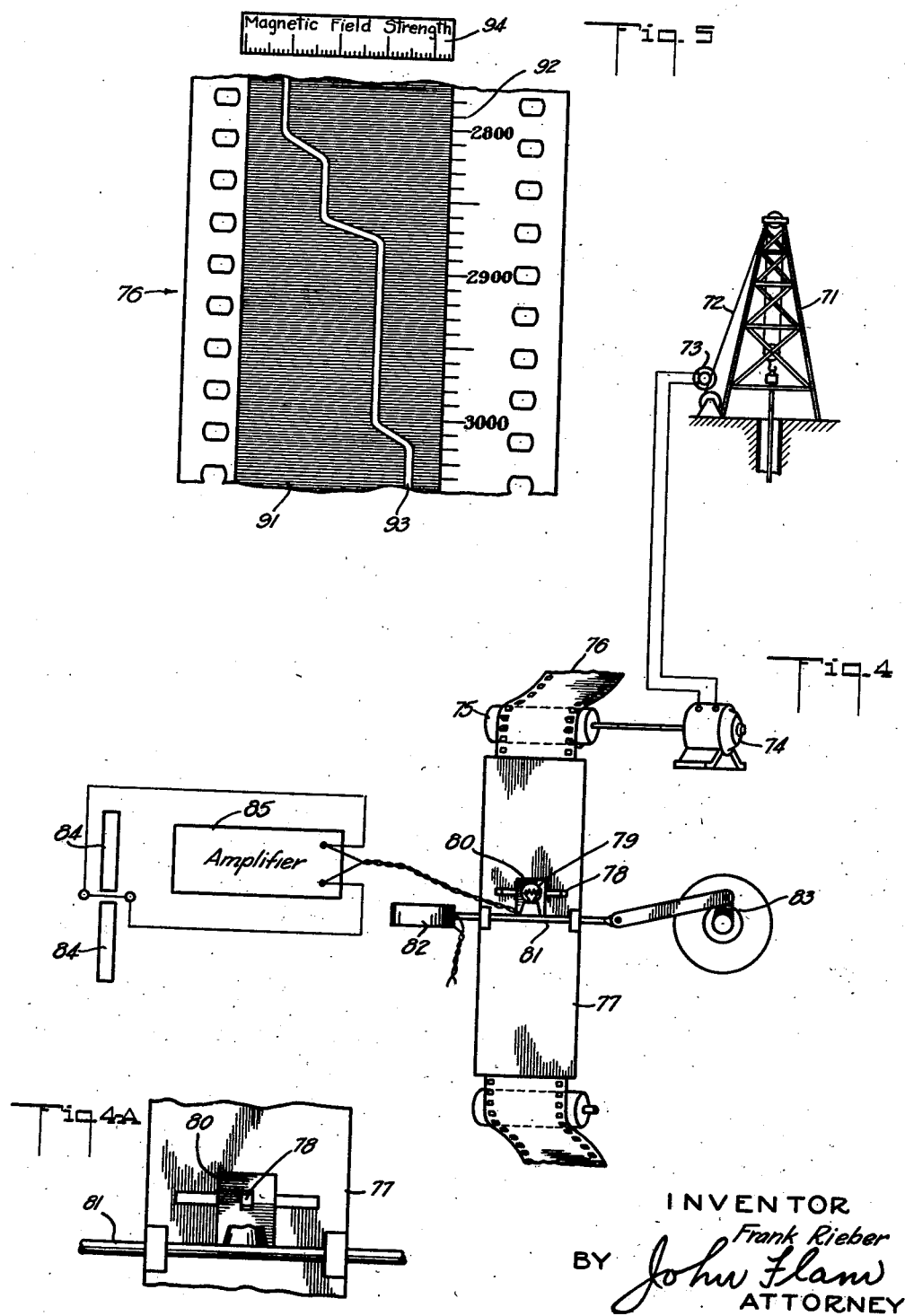

Patented Nov. 4, 1941

2,261,563

UNITED STATES PATENT OFFICE 2,261,563

SYSTEM FOR MEASURING EARTH CONDUCTIVITY

Frank Rieber, Los Angeles, Calif.

Application February 18, 1939, Serial No. 257,156

6 Claims. (Cl. 175—182)

My invention relates to the determination of the electrical conductivity of the strata penetrated by bore holes and is of particular use in maintaining a record of the strata encountered while drilling oil and gas wells.

An object of my invention is to provide means whereby the electrical characteristics of the said strata may be determined while the well is being drilled.

A further object of my invention is to provide means for logging bore holes which shall be simple in construction, and which will operate to produce a permanent record without the continuous attention of a skilled operator.

A further object of my invention is to provide a method for logging bore holes which does not require the introduction into the bore hole of any specially designed electrical conducting system, or the use of insulated cables or electrodes lowered into the hole.

Further objects of my invention will appear from the following disclosure.

The electrical characteristics and particularly the conductivity of strata if recorded continuously with depth, are commonly used at present as a means for correlating between adjacent wells. Use of these electrical measurements is also made to determine the location, in such a bore hole, of possible oil bearing formations, to permit the operator to make tests, or to seat perforated casing at the appropriate depth.

Measurements for these purposes are commonly made by lowering into the well an insulated cable having two or more conductors, to the lower ends of which electrodes are attached. By applying external potential between certain of these electrodes, and by measuring the potentials existing between other certain electrodes, or between some of them and a surface electrode, a continuous record of the electrical properties of the strata immediately surrounding the bore hole can be made. Apparatus for accomplishing this is usually mounted on heavy trucks, the chief item of weight being an extremely strong insulated electric cable wound on a reel. Such cables commonly engage a measuring wheel, before passing into the well, this measuring wheel rotating once per unit of measured length of the cable. A shaft or other link is provided by which rotation of the measuring wheel drives a recording strip, commonly photographic film, past the recording galvanometers contained in the truck, a given length of film thus representing a proportionate vertical travel of the electrodes within the well.

A surface electrode is commonly connected to the upper end of the well casing, or immersed in the mud sump or connected to both such places. Potentials applied between or measured between this surface electrode and various of the moving electrodes in the well or between said moving electrodes only, serve to give indications which are recorded by the galvanometers above referred to. In proper combination, these indications enable a skilled operator to draw conclusions as to the nature of the strata penetrated.

The electric currents whose flow causes the above described apparatus to function, penetrate for only a relatively short distance into the strata surrounding the hole. It is now common practice to arrange the moving electrodes at various intervals in the hole, to permit several records to be made. Those made between closely spaced electrodes will relate to material immediately adjacent to the bore hole, while those made between electrodes of greater spacing will relate to materials extending to a greater distance from the bore hole.

By the method of my invention I propose to use the drill stem itself as one electrode, making connection thereto by attaching suitable conductors to the upper end of the casing, or to electrodes buried in the mud sump, or by making contact to the rotating drill stem itself.

In addition to this drill stem electrode, I employ a second electrode placed at a considerable distance from the well. I apply suitable potential between this distant electrode and the conducting means above referred to by which current is conveyed to the drill stem.

Thus, with the drill stem in place, the drill having penetrated to any assignable depth in the earth, current may be caused to flow between the distant electrode and the drill stem. This current will set up a magnetic field.

The method of my invention differs from those heretofore used in that, having set up a flow of electric current as above described, I measure and record a chosen component of the magnetic field set up by this current flow, rather than any of the potential patterns existing in the earth and accompanying the flow of current.

My United States Patent No. 1,902,265 describes a method of electrical prospecting, in which current flows is set up between two selected points, both at the surface of the earth, and a component of the magnetic field due to such current flow is measured at a third point on the surface of the earth.

The invention herein described follows somewhat along the lines of that disclosed in the above mentioned patent, differing therefrom in that, in the present instance, one of the electrodes, namely, the drill, penetrates deeply into the earth. Another difference lies in the fact that the method herein proposed for making the actual measurements of the magnetic fields is different from and superior to that disclosed in the said U. S. Patent 1,902,265.

I wish to note here that one method for measuring magnetic fields which I employ in the herein described invention, follows along the general lines laid down in another of my U. S. Letters Patent No. 1,863,415, the field measuring apparatus herewith described being, however, a definite improvement over that disclosed in the patent last above mentioned.

To further comprehend my invention, reference should be had to the accompanying diagrams, in which Figure 1 is a schematic sectional view of my invention;

Fig. 2 represents a form of rotating commutator which I find it convenient to use in conjunction with my invention;

Fig. 3 represents the detecting element which I prefer to employ for the detection of magnetic fields;

Fig. 4 illustrates schematically how this detecting element may be made to record its findings on a continuous record which may be later used by the operator in drawing inferences as to the strata penetrated;

Figure 1:
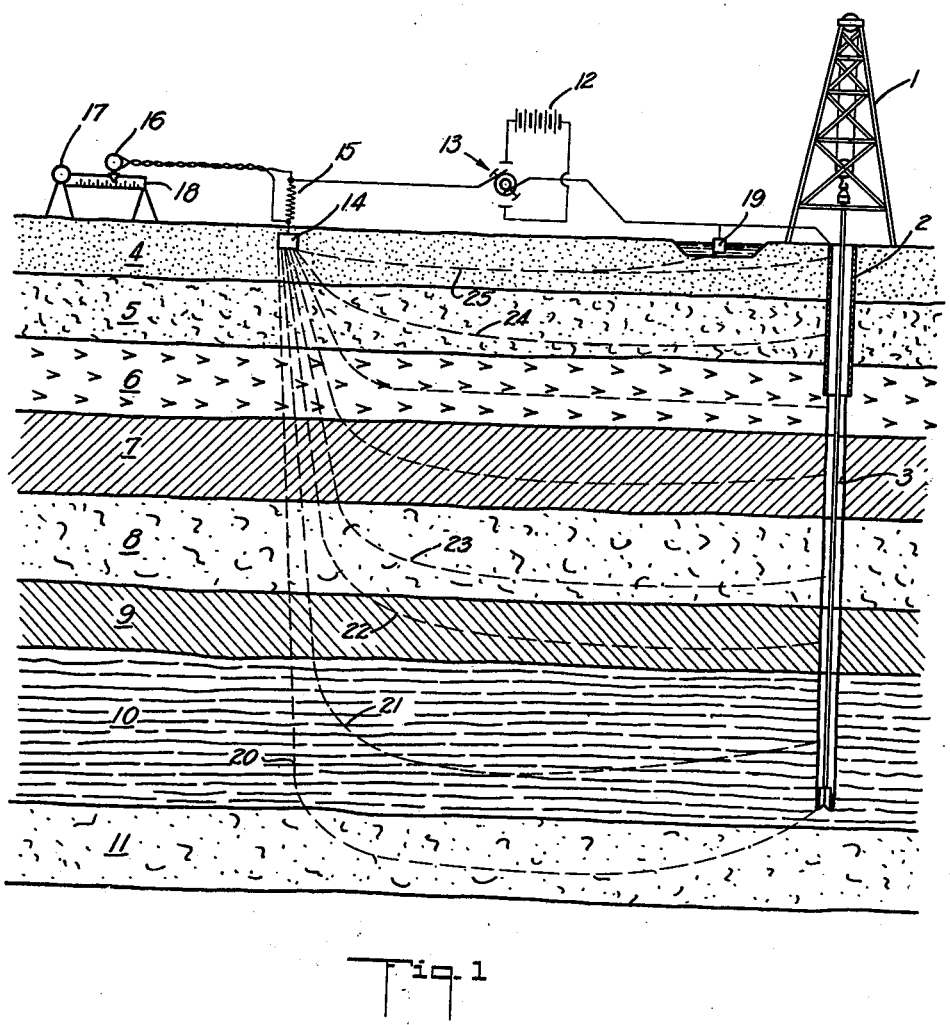

Fig. 4—A is a fragmentary enlarged view showing a portion of the apparatus of Fig. 4;

Fig. 5 shows in graphic form a record of the form obtainable by my invention.

Referring to Figure 1, 1 represents the derrick of a well, in which casing has been placed as indicated at 2, while 3 represents the open hole drilled through the strata 4, 5, 6, 7, 8, 9 and 10, and about to penetrate the stratum 11. 12 represents a source of potential, preferably a storage battery capable of furnishing relatively heavy currents. 13 represents in schematic form a motor driven reversing switch, a preferred form of which is shown with greater detail in Fig. 2. 14 represents an electrode buried in the earth at some convenient distance from the well. 15 represents a resistance element preferably so constructed as to maintain a very constant resistance, and at the same time to be capable of carrying relatively heavy currents. For this purpose I may employ a high grade meter shunt. 16 represents a small coil, connected across the terminals of the resistance 15. 17 represents a field detector for responding to the magnetic field caused by the flow of current in the earth, a preferred form of which is shown in detail in Fig. 3. 18 represents a scale along which the coil 16 may be moved, the readings of said scale against an index attached to said coil constituting the quantity which the apparatus is adapted to measure, this quantity being translatable into comparative field strength per unit of current. 19 represents a contact adapted to supply current to the drill stem, preferably consisting of an electrode placed in the mud sump of the well, and also of a conductor connected to the upper end of the casing of the well.

In operation, the depth of the well is measured by one of various methods well known to the art, and recorded. Simultaneously, the rotating conductor 13 is set in operation, supplying periodically reversed potential between the contacts 14 and 19. Due to these potentials, current flow will take place in the earth, the lines of equal current being indicated on the drawings as 20, 21, 22, 23, 24, 25.

Current flow along each of these paths creates a magnetic field, having a horizontal component at the location of the field measuring instrument 17. For reasons more fully set forth in my U. S. Patent No. 1,902,254 hereinabove referred to, the current flowing along a path such as 20 will be far more effective in creating a field at the instrument 17 than will an equal amount of current flowing along a path such as 24 or 25.

At the same time that current flows from the electrode 14 to the electrode 19, potential is developed across the terminals of resistance 15, this potential causing a current to flow through the measuring coil 16. Consequently, a magnetic field is developed by the coil 16, the strength of this field being proportionate to the current flow between the electrodes 14 and 19. By properly connecting the coil 16, its field may be made to oppose in direction the field due to the flow of the earth currents between the electrodes 14 and 19, and reaching the field detector 17. By sliding the coil 16 to the proper position along the scale 18, the strength of the field acting on the field detector 17, and due to the coil 16, may be made exactly equal to the strength of the field acting on the detector 17 and due to the earth currents. Under such conditions, the detector 17 will be in effect in a zero field, and will thus cease to indicate.

Therefore, by sliding the coil 16 back and forth along the scale 18, a null position may be determined, at which the detector 17 does not respond at all. The reading of the scale 18 for this null position is then recorded along side of the record of the depth of the well.

As the well proceeds to greater and greater depth, each depth may be recorded, and the corresponding position of the coil 16 may be recorded also.

If one of these quantities is plotted against the other in graphic form, the resultant curve may be considered as a function of the stratigraphic column penetrated by the well.

Referring to Fig. 2, which shows a novel form of reversing switch which I prefer to use in conjunction with the herein described invention, 31 represents a motor, 32 represents a casing of insulating material in which conducting sectors 33 and 34 are imbedded. 35 represents a drum of insulating material adapted to rotate within the casing 32, in close approximation thereto, the small space 36 between the casing and the drum being filled with conducting fluid, such as salt water. Two conducting segments 44 and 45 are imbedded in the rotating insulating drum 35, each such segment being connected to one of the slip rings 37 and 38, which are engaged respectively by brushes 39 and 40 communicating to terminals 42 and 43. The battery 41 supplies potential to the stationary conducting segments 33 and 34.

When the device is in operation, the motor rotates the moving conducting segments 44 and 45 repeatedly past the stationary conducting segments 33 and 34, current being readily conducted from a moving to a stationary segment through the relatively short path of salt water interposed between them. As the moving sectors are rotated out from beneath the stationary sectors, the conductivity of the relatively thin film of salt water between the rotating and stationary members is so low that the current flow drops off rapidly but not so abruptly as to cause surging or sparking. An advantage of this type of reversing switch is accordingly that it can accomplish periodic and regular reversals of heavy current without sparking or irregularity of performance.

Fig. 3 shows in diagrammatic form the field detecting means which I prefer to employ in conjunction with the herein described invention, which means is shown at 17 in Fig. 1. Referring to Fig. 3, 51 and 52 represent bars of highly permeable magnetic material such as Permalloy or Permimvar, on which are wound helical coils 53 and 54, supplied with alternative current at a relatively high frequency by the oscillator 55 and so arranged that the opposed poles of the bars 51 and 52 present identical magnetic polarity as respects the alternating field created in the said bars by the oscillator 55. A permanent magnet 56 is mounted in the vicinity of the bars 51 and 52, the magnet 56 being angularly adjustable, its position being indicated by the pointer 57 on the dial 58. The purpose of this magnet 56 is to induce in the bars 51 and 52 a field component equal to the horizontal component of the earth's field at the place where the device is to be used. When the magnet 56 has been properly adjusted, no flux will exist in the bars 51 and 52 unless some source of magnetic field other than the earth or the magnet 56 acts upon the bars. A fine wire or filament 59 is placed under tension between the opposed poles of the bars 51 and 52, this wire being connected as one of the resistive elements in a Wheatstone network whose other elements are 60, 61 and 62. This network is supplied with potential across its terminals 64 and 65, from the output circuit of the amplifier 63, whose input circuit is supplied from the terminals 66, 67 of the Wheatstone network. In operation, the resistances comprising the Wheatstone network are so adjusted with respect to the resistance of the wire 59 that the network is in complete balance. Under these conditions, and with no magnetic field existing between the bars 51 and 52, no feed-back will be present in the amplifier 63. If, however, a magnetic field is supplied between the opposing faces of the bars 51 and 52, this field will react upon the wire 59 in such fashion that a dynamic component, due to motion of the wire, will be introduced into the network. Thus any slight irregularity in the output of the amplifier 63 will supply a force tending to deflect the wire 59, which, due to its inertia, will continue moving in the direction in which it is deflected, thereby generating a potential out of phase with the original applied impulse. This potential upsets the Wheatstone network, causing an electric pulse to develop across the terminals 66, 67. This pulse, fed back into the input terminals of the amplifier 63, is amplified and re-applied to the network, causing a deflection of the wire in the opposite direction. The device thus becomes in effect an oscillator, whose frequency is determined solely by the tension of and the mass of the wire, and the wire will continue to vibrate at all times when a field is present between the bars 51 and 52. If this field is at any time reduced to zero, however, the vibration of the wire will cease. I find that such vibrating wire devices constitute detectors of continuous magnetic fields, and have, when applied for this purpose an extreme sensitivity.

Referring to Fig. 4, 71 represents a drill derrick, in which the hoist cable 72 engages a measuring device 73, which may be a small synchronous motor of the type usually termed Selsyn, the motor 73 being coupled to a similar Selsyn motor 74 in the manner well known to the art, in such manner that motion of the cable 72 results in corresponding rotation of the motor 74 which drives a sprocket 75 adapted to move a photographic record 76, in such fashion that the motion of the record 76 is proportional to the motion of the cable 72, and hence also proportional to the vertical motion of the drill stem in the well 71.

77 represents a shield covering the record 76, and provided with a slot 78, through which light from an indicator lamp 79 is permitted to pass. A suppressing shield 80 suppresses this indicator lamp, the said shield 80 having a small opening cooperating with the slot 78 (see Fig. 4—A) to the effect that light from the lamp 79 at any given instance will strike the record strip 76 in a very small spot. The lamp 79 is mounted on a reciprocating rod 81, a magnetising coil 82 being likewise mounted on the reciprocating rod 81. This coil 82 is arranged to carry a portion of the earth's current which is caused to flow in the method of my invention. A coil having a similar function is illustrated at 16 in Fig. 1, which latter figure likewise illustrates the balance of the circuit in which the coil is connected. Current to this magnetising coil 82 may be supplied through twisted flexible conductors.

84 represents in schematic form two highly permeable bars as used in the field detecting element of my invention, and shown in great detail in Fig. 3.

85 represents likewise in schematic form the amplifier which I use in conjunction with these permeable bars in my field detecting method. This amplifier 85 is likewise adapted to furnish current to the small indicator lamp 79.

In operation, the current through the coil 82, forming a small proportional part of the current passing through the earth in the method of my invention, is so adjusted, and the distance between the coil 82 and the detecting bars 84 is likewise so adjusted, that the field due to the coil 82, acting on the bars 84, will approximately neutralize the field acting on the bars 84 and due to the passage of current through the earth, as illustrated in Fig. 1. After making such adjustments, the crank 83 is set in motion by some appropriate driving means such as a motor, with the result that the bar 84 is set in reciprocating motion, causing the coil 82 to alternately approach and recede from the detector bars 84. At some point in such motion of the coil 82, the field from this coil will neutralize entirely the magnetic flux in the bars 84, at which point, as has been previously explained, the amplifier 85 will stop the supply current to the lamp 79 which will correspondingly be extinguished.

As the drill in the derrick 71 is progressing to greater and greater depths, the record 76 will be set in corresponding motion, with the result that the lamp 79 will print on the record strip 76 a record of somewhat the form shown in Fig. 5 in which 91 represents a dark portion of the record strip, after development, indicating that on such portion of the record strip, an unbalanced field was acting on the detector bars 84.

93 represents the portion of the record at which lamp 79 shown in Fig. 4 is extinguished, indicating a position of the coil 82 shown in Fig. 4, at which the field on the bars 84 is completely neutralized.

A scale 92 may be provided on the record strip 91 shown in Fig. 5, which scale is calibrated in terms of the depth to which the drill has penetrated the earth. Deflections of the indicator line 93 may be read in terms of the scale 94, which may be calibrated in arbitrary units of magnetic field strength.

What is claimed is:

1. The process of ascertaining electrical earth conductivities along a well bore, which comprises passing a current through the earth, between a spaced point and the bore, influencing a magnetic member with a component of the magnetic field produced by said current, reducing the effect of said component on said member to zero by moving a magnet the strength of which is proportional to said component, and recording the position of said magnet relative to said member when said zero point is reached.

2. The process of ascertaining electrical earth conductivities along a well bore, which comprises passing a current through the earth, between a spaced point and the bore, influencing a magnetic member so that the effect of the magnetism of the earth is nullified, and so that it is susceptible to a component of the magnetic field produced by said current, influencing a stretched filament by said member so as to cause it to vibrate under the influence of said component, reducing said vibrations by movement of a magnet having a strength corresponding to said current flow, and indicating the position of said magnet when its magnetism neutralizes the effect of said component upon said filament.

3. In a system for ascertaining electrical conductivity of the earth adjacent a well bore, means for passing a current through the earth from a spaced point to the wall of the bore, means for periodically reversing said current, means providing a vibratory magnetic member adapted to be set into vibration by a component of the magnetic field set up by the current, an electromagnet excited in accordance with said current, means for moving the electromagnet to reduce the vibrations of the vibratory member to zero, and means for indicating the neutralizing position of said electromagnet.

4. In a system of the character described, a vibratory magnetic filament, an electromagnet influencing said filament, means for supplying a current to the electromagnet that reverses periodically, a bridge circuit in which said filament forms an arm, an amplifier system, having an input and an output circuit respectively connected across the diagonals of the bridge, and an adjustable means for varying the influence of said magnetic field on said filament.

5. In a system of the character described, a bridge circuit including in one arm, a vibratory magnetic member capable of producing an electromotive force across said arm when vibrated in a magnetic field, means for subjecting said member to a periodically reversing magnetic field, and an amplifier system having an input circuit connected across one diagonal of the bridge circuit, and an output circuit connected across the other diagonal of said circuit.

6. In a system of the character described, a bridge circuit including in one arm, a vibratory magnetic member capable of producing an electromotive force across said arm when vibrated in a magnetic field, means for subjecting said member to a periodically reversing magnetic field, an amplifier system having an input circuit connected across one diagonal of the bridge circuit, and an output circuit connected across the other diagonal of said circuit, and supplemental adjustable magnetic means for varying the influence of said magnetic field on said filament.

FRANK RIEBER.